US 8,226,071 B2
Jul. 24, 2012

(12) United States Patent
Lape et al.

(54) APPARATUS FOR TRANSPORTING GENERATOR COILS

(75) Inventors: Brock M. Lape, Clifton Park, NY (US); Karl R. Anderson, III, Shorewood, IL (US); Yannick Lampron, Delson (CA); Alain E. Limoges, Sainte Catherine (CA)

(73) Assignee: General Electric Company, Schenectady, NY (US)

( * ) Notice: Subject to any disclaimer, the term of this patent is extended or adjusted under 35 U.S.C. 154(b) by 992 days.

(21) Appl. No.: 12/203,352

(22) Filed: Sep. 3, 2008

(65) Prior Publication Data
US 2010/0052278 A1    Mar. 4, 2010

(51) Int. Cl.
| B23Q 3/00 | (2006.01) |
| B23B 1/00 | (2006.01) |
| B65H 16/02 | (2006.01) |
| B65H 18/02 | (2006.01) |
| B65H 49/38 | (2006.01) |
| B65H 75/00 | (2006.01) |
| B65H 49/00 | (2006.01) |
| H02K 15/00 | (2006.01) |
| B62B 3/00 | (2006.01) |

(52) U.S. Cl. ....... 269/17; 242/594; 242/594.3; 242/593; 242/129; 29/596

(58) Field of Classification Search ................ 269/17; 242/86.5 R, 99, 22.8, 557, 594.3, 594.6, 129; 29/596; 310/156
See application file for complete search history.

(56) References Cited

U.S. PATENT DOCUMENTS

| 991,827 | A | * | 5/1911 | Capers | 242/594.1 |
| 1,009,827 | A | * | 11/1911 | Capers | 242/594.6 |
| 2,660,381 | A | * | 11/1953 | Friedl et al. | 242/557 |
| 3,856,230 | A | * | 12/1974 | Zimmer | 242/422.8 |
| 4,457,527 | A | * | 7/1984 | Lowery | 280/47.19 |
| 4,795,040 | A | | 1/1989 | Lopez | |
| 5,308,012 | A | * | 5/1994 | Fuller | 242/557 |
| 5,577,745 | A | | 11/1996 | Birk | |
| 5,687,928 | A | | 11/1997 | Lassiter | |
| 6,422,504 | B1 | * | 7/2002 | Elder | 242/594.6 |
| 7,150,459 | B2 | * | 12/2006 | Anderson et al. | 280/47.28 |
| 7,481,394 | B2 | * | 1/2009 | Gleason | 242/594.2 |
| 7,533,847 | B2 | * | 5/2009 | VeRost | 242/594.5 |
| 7,931,227 | B1 | * | 4/2011 | Oudekerk | 242/557 |
| 2004/0119256 | A1 | | 6/2004 | Anderson et al. | |
| 2006/0045690 | A1 | | 3/2006 | Faulk et al. | |
| 2008/0143069 | A1 | | 6/2008 | Richards et al. | |

* cited by examiner

*Primary Examiner* — Lee D Wilson
*Assistant Examiner* — Alvin Grant
(74) *Attorney, Agent, or Firm* — Mark E. Henderson; Ernest G. Cusick; Frank A. Landgraff (57) ABSTRACT

A cart and detachable hangers system for transporting copper coils that may include: 1) a cart with a substantially rectangular structure that includes at least two opposing side rails and at least two opposing end rails; 2) a plurality of pockets disposed along a top surface of each of the two opposing side rails; and 3) a plurality of hangers, each of the hangers including two projections that are sized such that each may detachably engage one of the pockets. The hanger and the cart are sized such that the distance between the projections correspond approximately to the distance between the pocket on one upper side rail and the opposing pocket on the other upper side rail.

16 Claims, 11 Drawing Sheets

APPARATUS FOR TRANSPORTING GENERATOR COILS

BACKGROUND OF THE INVENTION

The present application relates generally to apparatus for refurbishing and cleaning generator coils. More specifically, but not by way of limitation, the present application relates to a cart used to transport generator coils during the refurbishment and cleaning process.

Electrical generators generally consist of a rotor that spins a series of large electromagnets within a coil of copper, called the stator. The magnetic field between the coil and the rotating magnets creates an electric current, thus converting the mechanical energy of the spinning rotor into electrical energy. Such generators have many industrial applications. For example, hydro generators are used at dam installments to convert the energy of the flowing water into electrical energy.

Periodically, the copper coils within the electrical generators require servicing, which generally includes a replacement or a refurbishing of the coils for reuse. Economic considerations generally favor refurbishing and reusing the coils over replacing the coils. However, refurbishment is a lengthy and costly process.

One of the significant steps in the refurbishment process is the cleaning of the copper coils. The coils must be cleaned of all of the insulation material that was applied to the coil before use as well as any oxidation or other residue that resides on the coils. The insulation material, which may include fish paper, Nomex® or other similar materials, is baked onto the coils and, thus, is difficult to remove. As a result, the removal process often includes several types of cleaning procedures. These procedures generally require that the copper coil be moved to different locations or cleaning stations within a cleaning facility. One of ordinary skill in the art will appreciate that moving the various copper coils, which have sizes and shapes that vary significantly, between cleaning stations in an efficient and cost-effective manner is a challenging task. As a result, there is a need for improved apparatus, systems and/or methods for transporting the copper coils during the refurbishment or other type of cleaning or maintenance process.

BRIEF DESCRIPTION OF THE INVENTION

The present application thus describes a cart and detachable hangers assembly. The assembly may include a cart with a substantially rectangular structure that includes: 1) at least two opposing side rails and at least two opposing end rails; 2) a plurality of pockets may be disposed along each of the two opposing side rails; and 3) at least two hangers. Each of the hangers may include two projections that are sized such that each may engage one of the pockets.

The present application further describes a cart and detachable hangers system for transporting copper coils. The cart and hanger system may include: 1) a cart with a substantially rectangular structure that includes at least two opposing side rails and at least two opposing end rails; 2) a plurality of pockets disposed along a top surface of each of the two opposing side rails; and 3) a plurality of hangers, each of the hangers including two projections that are sized such that each may detachably engage one of the pockets. The hanger and the cart are sized such that the distance between the projections correspond approximately to the distance between the pocket on one upper side rail and the opposing pocket on the other upper side rail.

These and other features of the present application will become apparent upon review of the following detailed description of the preferred embodiments when taken in conjunction with the drawings and the appended claims.

DETAILED DESCRIPTION OF THE INVENTION

Figure 1:
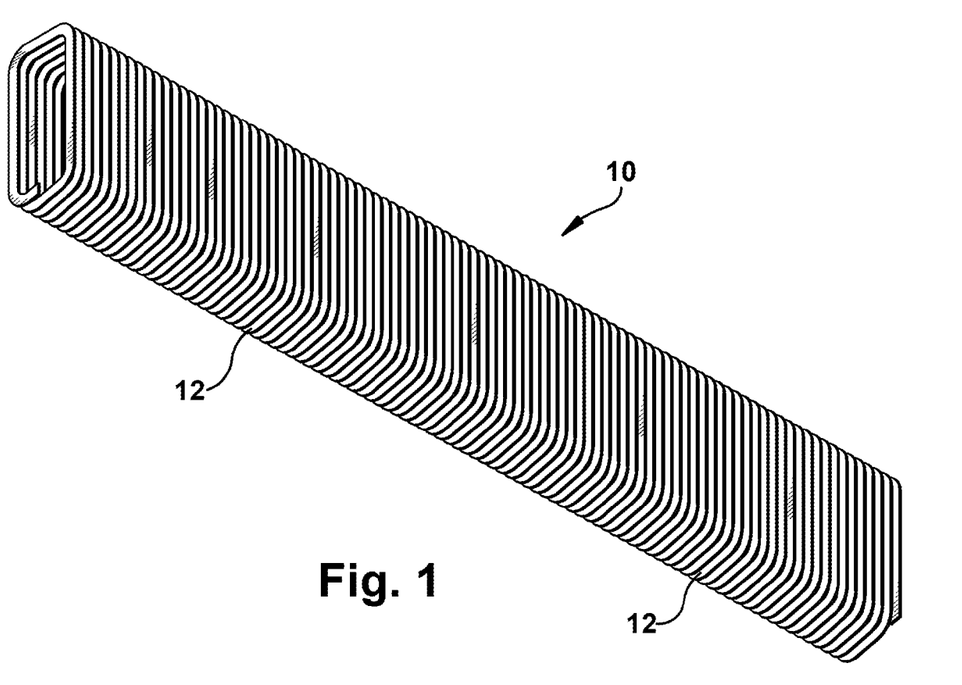
FIG. 1 is a perspective view of a copper coil that may be cleaned and refurbished pursuant to embodiments of the present application.
Figure 2:
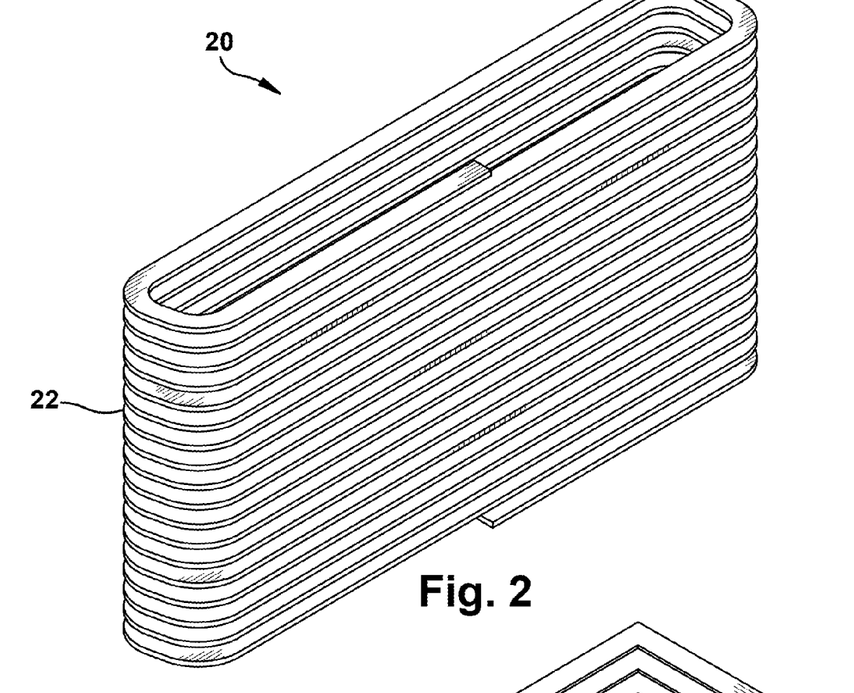
FIG. 2 is a perspective view of an alternative copper coil that may be cleaned and refurbished pursuant to embodiments of the present application.
Figure 3:
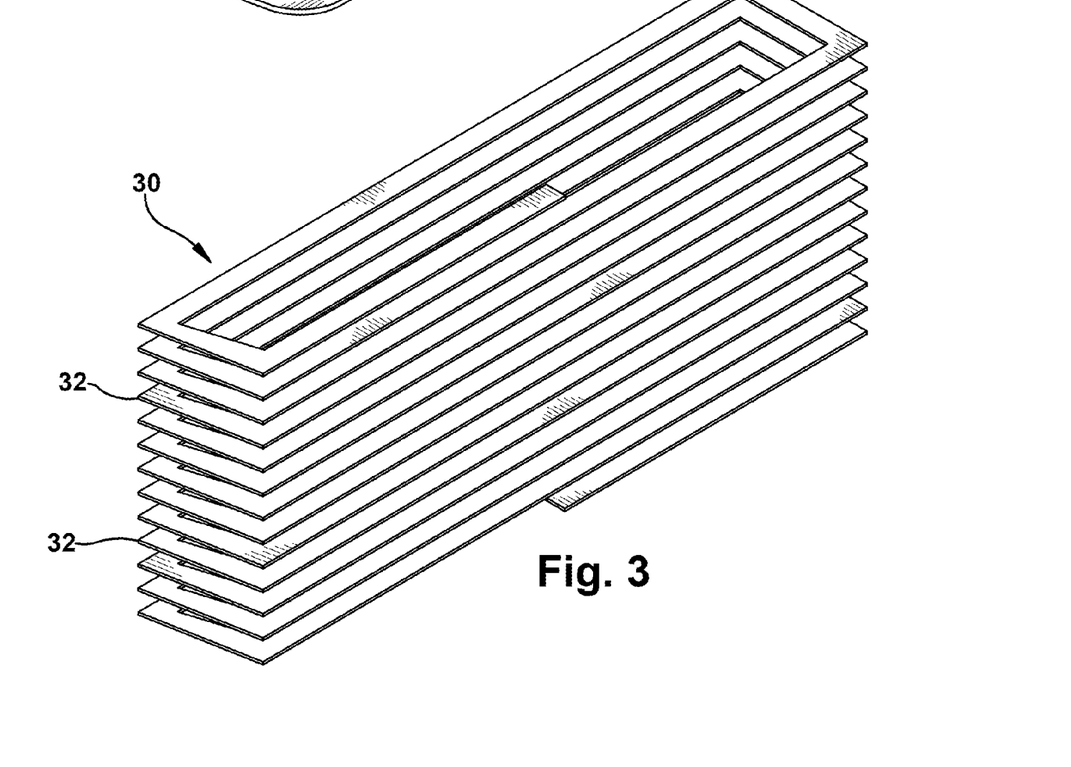
FIG. 3 is a perspective view of an alternative copper coil that may be cleaned and refurbished pursuant to embodiments of the present application.

Referring now to the Figures, where the various numbers represent like parts throughout the several views, FIGS. 1-3 illustrate various examples of copper coils that are commonly used in generator applications. FIG. 1 illustrates a small copper coil 10. The small copper coil 10 is typical of many of the "small coils" used in smaller generator applications. The small copper coil 10 may be made of copper, though other materials are possible. The small copper coil 10 may include a number of individual coils or turns 12. The small copper coil 10 may be approximately 125 inches long and include approximately 100 turns. The rectangle formed by each of the turns 12 of the small copper coil 10 may be approximately 20 inches long and 10 inches wide. The rectangular cross-section of the copper that makes up the small copper coil 10 may be approximately 0.05"×1.25". The spacing between each of the turns 12 may be approximately 1.25". The small copper coil 10 may weigh approximately 100 pounds.

FIG. 2 illustrates a medium copper coil 20. The medium copper coil 20 is typical of many of the "medium coils" used in medium generator applications. The medium copper coil 20 also may be made of copper, though other materials are possible. The medium copper coil 20 may include a number of individual coils or turns 22. The medium copper coil 20 may be approximately 30 inches long and include approximately 17 turns. The rectangle formed by each of the turns 22 of the medium copper coil 20 may be approximately 60 inches long and 10 inches wide. The rectangular cross-section of the copper that makes up the medium copper coil 20 may be approximately 0.5"×1.9". The spacing between each of the turns 22 may be approximately 1.9". The medium copper coil 20 may weigh approximately 600 pounds.

FIG. 3 illustrates a large copper coil 30. The large copper coil 30 is typical of many of the "large coils" used in large generator applications. The large copper coil 30 also may be made of copper, though other materials are possible. The large copper coil 30 may include a number of individual coils or turns 32. The large copper coil 30 may be approximately 50 inches long and include approximately 12 turns. The rectangle formed by each of the turns 32 of the large copper coil 30 may be approximately 125 inches long and 25 inches wide. The rectangular cross-section of the copper that makes up the large copper coil 30 may be approximately 0.4"×4.3". The spacing between each of the turns 32 may be approximately 4.3". The large copper coil 30 may weigh approximately 4000 pounds. As those of ordinary skill in the art will appreciate, copper coils may come in varying and different sizes, both larger and smaller than those described above, depending on the application. The above-described examples are provided to give an overview of the different types of coils that are commonly used. Further, the above-described examples relate to copper coils. Those of ordinary skill in the art will appreciate that the innovative methods described by the present application may be used on coils of different metallic properties. The use of copper throughout the present application is exemplary only.

Figure 4:
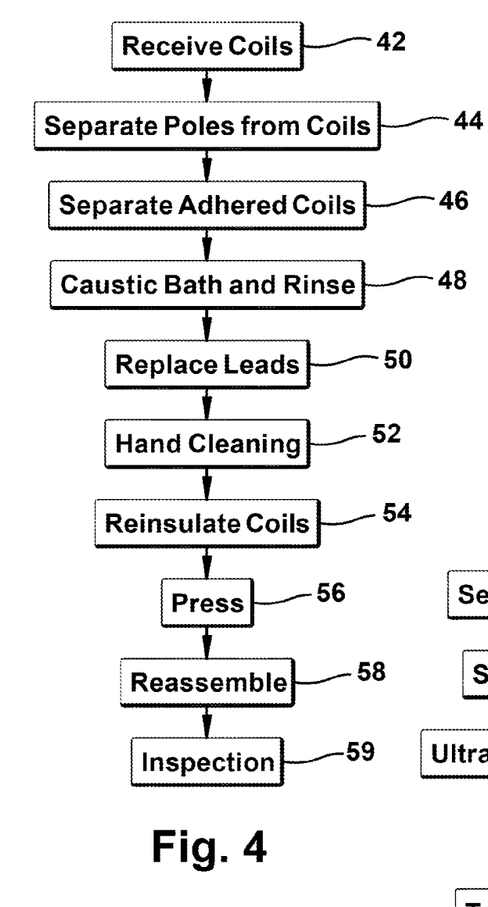
FIG. 4 is a flow diagram illustrating a conventional copper coil cleaning and refurbishment process.

FIG. 4 illustrates a flow diagram 40, which generally demonstrates a conventional cleaning process currently used in the refurbishment of copper coils. The copper coils cleaned and refurbished by this process may include any of the coils discussed above, i.e., the small copper coil 10, the medium copper coil 20 or the large copper coil 30. At a block 42, the copper coil may be received from being shipped from the location of the generator. As described, the received copper coil generally has baked on insulation, oxidation residue and other containments that must be removed before the copper coil can be reinsulated and made ready for reuse. The copper coil, as received, also may have poles attached to them. At a block 44, the poles may be removed from the coil. The removed poles may be cleaned separately by conventional methods (not shown in flow diagram 40). At block 46, any adhered coils may be separated, i.e., any turns within the copper coil that are stuck together may be separated.

With this initial preparation work completed, the coil may be placed in a caustic bath at a block 48. In general, the caustic bath may consist of a submersion within a caustic solution, i.e., a solution with a pH above 7.0. In general, the coil is bathed in the caustic bath for approximately 8-12 hours. The caustic bath takes this amount of time to begin to remove or loosen the insulation and other contaminates from the copper coil. After the caustic bath, the coil may be rinsed with water to remove the caustic solution. Then, at a block 50 the leads of each copper coil may be removed and new leads attached.

The caustic bath at the block 48 generally does not remove all of the insulation from the copper coil. Further, along with the insulation, oxidation residue or other containments may remain on the copper coil after the caustic bath. Thus, at a block 52, it is necessary for the coil to undergo a lengthy hand-cleaning process. Generally, the hand-cleaning consists of a manual cleaning with abrasive pads and a spray-on cleaning agent. The hand-cleaning continues until the copper coil is thoroughly cleaned, i.e., substantially free of insulation, oxidation residue or other contaminants. Generally, on average, each copper coil must undergo 8 hours of hand-cleaning before they are cleaned to a sufficient level.

After the hand-cleaning of the block 52, the copper coil has been sufficiently refurbished such that the process of preparing the copper coils for reuse may begin. Thus, at a block 54, the copper coil may be reinsulated. The reinsulation process generally includes applying new insulation to the copper coil. After reinsulation is complete, the copper coil is pressed at a block 56 and reassembled at a block 58. The reassembly at block 58 includes reattaching the poles that were separated from the copper coil at block 44. After an inspection at a block 59, the refurbished copper coil may be shipped back to the generators for reuse. Or, if the copper coil fails the inspection in some manner, the copper coil may be sent back to the beginning of the process or to any of the intermediate steps as necessary.

The cleaning steps of the refurbishment process, i.e., the caustic bath of block 48 and the hand-cleaning of block 52, generally comprise a significant amount of the overall refurbishment process of block diagram 40. As described above, these two steps may take approximately 16-20 hours per coil, which includes approximately 8-12 hours in the caustic bath and approximately 8 hours of hand-cleaning.

Figure 5:
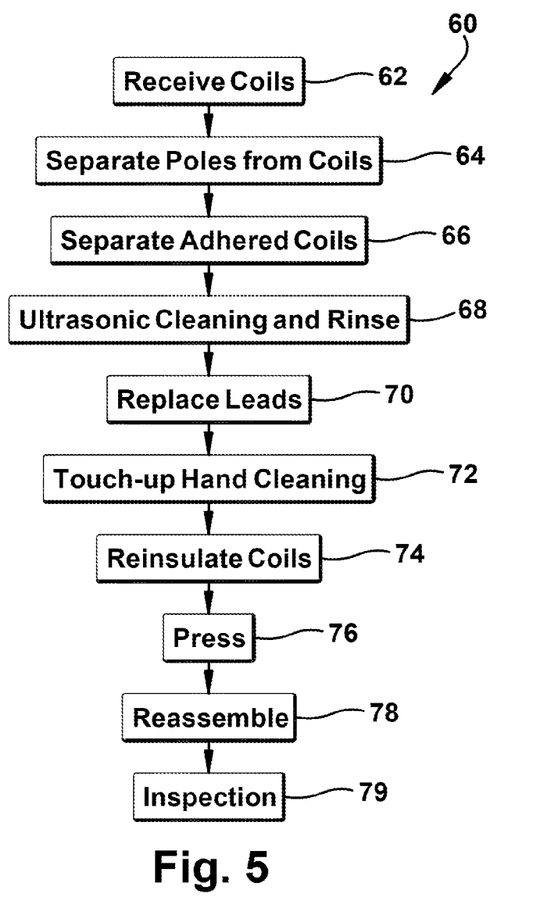
FIG. 5 is a flow diagram illustrating a copper coil cleaning and refurbishment process using ultrasonic cleaning in accordance with an exemplary embodiment of the present application.

FIG. 5 illustrates a flow diagram 60, which generally demonstrates a copper coil cleaning and refurbishment process using ultrasonic cleaning in accordance with an exemplary embodiment of the present application. The copper coils refurbished by this process may include any of the coils discussed above, i.e., the small copper coil 10, the medium copper coil 20 or the large copper coil 30. At a block 62, the copper coil may be received from being shipped from the location of the generator. As described, the received copper coil generally has baked on insulation, oxidation residue and other containments that must be removed before the copper coil can be reinsulated and made ready for reuse. The copper coil, as received, also may have poles attached to them. At a block 64, the poles may be removed from the copper coil. The removed poles may be cleaned separately by conventional methods (not shown in flow diagram 40). At block 66, any adhered coils may be separated, i.e., any turns within the copper coil that are stuck together may be separated.

With this initial preparation work completed, the coils may be placed in a bath with ultrasonic cleaning at a block 68. In general, the bath with ultrasonic cleaning includes immersion of the coils in an aqueous solution through which ultrasonic pressure waves are passed. Depending on the application, the aqueous solution may be an acidic solution or caustic solution. In the case of an acidic solution, the aqueous solution, in some embodiments, may have a pH of between 1 and 7. In other embodiments, the pH may be approximately 1. The acidic solution may be formed, for example, with citric acid or other similar reactants. As stated, in other embodiments, the aqueous solution may be a caustic solution. In some embodiments, the pH of the caustic solution may be between 8 and 13. In other embodiments, the pH of the caustic solution may be approximately 13. The caustic solution may be formed, for example, with sodium hydroxide or other similar reactants. The temperature of the aqueous solution may be elevated. In some embodiments, the temperature of the aqueous solution may be between 50° and 85° C. In other embodiments, the temperature of the aqueous solution may be approximately 77° C.

The ultrasonic cleaning system and process are described in more detail below. In general, ultrasonic cleaning includes immersing the coils in an aqueous solution through which ultrasonic pressure waves are passed. The ultrasonic pressure waves, as described in more detail below, aid in the removal of insulation, oxidation residue, and other contaminants that are baked on or otherwise attached to the copper coils. In certain embodiments, the frequency of the ultrasonic pressure waves applied through the aqueous solution may be approximately 29 to 31 kHz. Each copper coil may remain immersed in the aqueous solution of the ultrasonic cleaning system for approximately 3-4 hours before the cleaning is complete, though the time may vary depending on the application or the desired level of cleaning. After the immersion in the aqueous solution, the coils may be rinsed with water. The water rinse may include bathing the copper coils in a water tank. In other embodiments, the coils may be sprayed with water. Then, at a block 750 the leads of each copper coil may be removed and new leads attached.

The ultrasonic cleaning at the block 68 generally removes a substantial amount of the insulation and other contaminants from the copper coils. However, some insulation, oxidation residue and/or other contaminants may remain on the copper coils after the ultrasonic cleaning. Thus, at a block 72, a hand cleaning may be performed to remove any of the remaining contaminants. Generally, the hand cleaning includes a brief manual cleaning with abrasive pads and a spray-on cleaning agent. The hand cleaning of block 72 continues until the copper coil is thoroughly cleaned, i.e., substantially free of insulation, oxidation residue or other contaminants. Generally, given the amount of insulation and containments removed during the ultrasonic cleaning of block 68, each copper coil must undergo only approximately 1 hour of hand cleaning before the copper coils are cleaned to a sufficient level.

After the hand cleaning of the block 72, the copper coil have been sufficiently refurbished such that the process of preparing the copper coil for reuse may begin. Thus, at a block 74, the copper coil may be reinsulated. The reinsulation process includes applying new insulation to the copper coil. After reinsulation is complete, the copper coil may be pressed at a block 76 and reassembled at a block 78. The reassembly at block 78 includes reattaching the poles that were separated from the coil at block 64. After an inspection at a block 79, the refurbished copper coil may be shipped back to the generators for reuse. Or, if the copper coil failed the inspection in some manner, the copper coil may be sent back to the beginning of the process or to any of the intermediate steps as necessary.

As illustrated, the cleaning steps of the refurbishment process of flow diagram 40 (i.e., the caustic bath of block 48 and the hand-cleaning of block 52) generally take 16-20 hours per coil, whereas the cleaning steps of the refurbishment process of flow diagram 60 (i.e., the ultrasonic cleaning of block 68 and the hand-cleaning of block 72) generally take 4-5 hours per coil. As such, a significant savings in time is realized.

Figure 6:
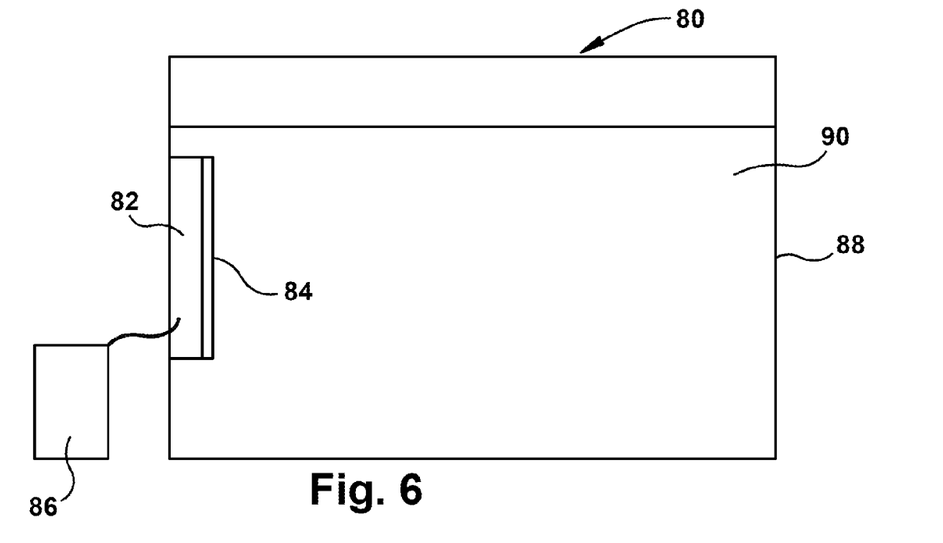
FIG. 6 is a schematic plan of an ultrasonic cleaning system in accordance with an exemplary embodiment of the present application.

FIG. 6 illustrates a schematic diagram of an exemplary ultrasonic cleaning system 80 that may be used in the process described by the flow diagram 60, though other ultrasonic cleaning systems also may be used. As one of ordinary skill in the art will appreciate, ultrasonic cleaning generally involves the use of high-frequency pressure waves (above the upper range of human hearing, or about 18 kHz) to remove contaminants from parts immersed in an aqueous medium. In a process called cavitation, micron-sized bubbles form and grow due to alternating positive and negative pressure waves in the aqueous medium. The bubbles subjected to these alternating pressure waves continue to grow until they reach resonant size, at which point they implode.

Just prior to the bubble implosion, there is a tremendous amount of energy stored inside the bubble itself. Temperature inside a cavitating bubble can be extremely high, with pressures up to 500 atm. The implosion event, when it occurs near a hard surface, changes the bubble into a jet about one-tenth the bubble size, which travels at speeds up to 400 km/hr toward the hard surface. With the combination of pressure, temperature, and velocity, the jet frees contaminants from their bonds with the substrate. Because of the inherently small size of the jet and the relatively large energy, ultrasonic cleaning has the ability to reach into small crevices and remove entrapped contaminants, which may include the removal of the insulation and other contaminants found on the copper coils, very effectively.

In general, in order to produce the positive and negative pressure waves in the aqueous medium, a mechanical vibrating device, which typically consists of a diaphragm attached to high-frequency transducers, is used. The transducers, which vibrate at their resonant frequency due to a high-frequency electronic generator source, induce amplified vibration of the diaphragm. This amplified vibration is the source of the positive and negative pressure waves that propagate through an aqueous solution in a tank. When transmitted through the aqueous solution, these pressure waves create the cavitation processes. The resonant frequency of the transducer determines the size and magnitude of the resonant bubbles. Typically, ultrasonic transducers used in the cleaning industry range in frequency from 20 to 80 kHz.

FIG. 6 illustrates the basic components of the ultrasonic cleaning system 80, which may include a bank of ultrasonic transducers 82 mounted to a radiating diaphragm 84, an electrical generator 86, and a tank 88 filled with an aqueous solution 90. As one of ordinary skill in the art will appreciate, the ultrasonic cleaning system 80 described herein is exemplary only. Other ultrasonic cleaning systems may be used. The ultrasonic transducers 82 may include piezoelectric transducers, magnetostrictive transducers or the like. In some embodiments, magnetostrictive tranducers may be preferable because of their ruggedness and durability.

The electrical generator 86 may convert a standard electrical frequency of 60 Hz into the high frequencies required in ultrasonic cleaning process, generally in the range of 20 to 80 kHz. As described above, the frequency used in the cleaning of the copper coils may be approximately 30 kHz. In some embodiments, the frequency may sweep between 29.5 and 30.5 kHz to eliminate standing waves and hot spots in the tank 88. The high frequency output of the electrical generator 96 may be used to vibrate the ultrasonic transducers 82 at their resonant frequencies, which may induce amplified vibration of the diaphragm 84. In some embodiments, the electrical generator 86 may include sweep frequency and/or autofollow circuitry.

The tank 88 may be rectangular in nature and be sized such that it allows the complete immersion of a copper coils, which may be, for example, any one of the copper coils discussed above (i.e., the small copper coil 10, the medium copper coil 20 or the large copper coil 30), in the aqueous solution 90. The ultrasonic transducers 82 may be placed, by weld or other means, on the bottom and/or the sides of the tank 88. The tank 88 generally will be sturdy in construction such it may support the copper coils, the aqueous solution 90 and other equipment. Ultrasonic cleaning systems generally may use any of several types of aqueous medium. In the application of cleaning and refurbishing copper coils, the aqueous solution 90 used in the ultrasonic cleaning system 90 may be caustic solution, though, as described above, an acidic solution also may be used.

In one embodiment, the ultrasonic cleaning system 80 may operate as follows. The copper coils and, if present, a cart (not shown) for carrying the copper coils may be immersed into the aqueous solution 90. The aqueous solution 90 may be a solution of sodium hydroxide having a pH of approximately 13. The sodium hydroxide solution, in some embodiments, may be heated to approximately 160° F. The frequency of the pressure waves applied through the sodium hydroxide solution may sweep between 29.5 to 30.5 kHz. Immersion into the solution may last approximately 3 to 4 hours, at which point the ultrasonic cleaning process may be complete and copper coils removed from the tank 88.

Figure 7:
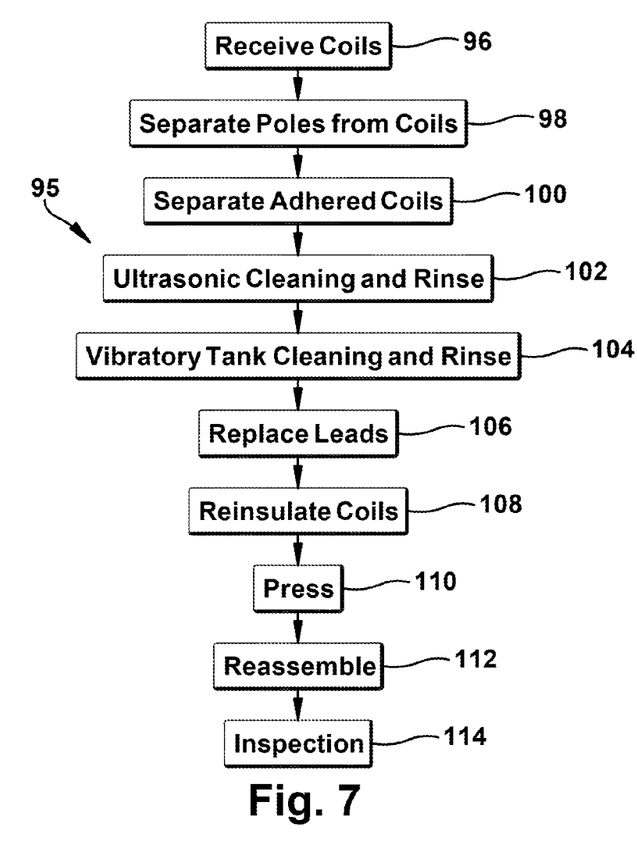
FIG. 7 is a flow diagram illustrating a copper coil cleaning and refurbishment process using ultrasonic cleaning and vibratory cleaning in accordance with an exemplary embodiment of the present application.

In some embodiments, the copper coil cleaning and refurbishment process using ultrasonic cleaning may be augmented with a vibratory cleaning process. FIG. 7 illustrates a flow diagram that includes a vibratory cleaning process in accordance with an exemplary embodiment, a flow diagram 95. As with the flow diagram 40, 60, the copper coils refurbished by this process may include any of the coils discussed above, i.e., the small copper coil 10, the medium copper coil 20 or the large copper coil 30. At a block 96, the copper coil may be received from being shipped from the location of the generator. At a block 98, the poles may be removed from the copper coil. The removed poles may be cleaned separately by conventional methods (not shown in flow diagram 95). At a block 100, any adhered coils may be separated, i.e., any turns within the copper coil that are stuck together may be separated.

With this initial preparation work completed, the copper coil may be placed in a bath with ultrasonic cleaning at a block 102. In general, as described above in relation to flow diagram 60, the bath with ultrasonic cleaning may include immersion of the copper coil in an aqueous solution through which ultrasonic waves are passed. Each copper coil may remain immersed in the aqueous solution of the ultrasonic cleaning system for approximately 1 to 4 hours before cleaning is complete, though the time may vary depending on the application or the desired level of cleaning. After the immersion in the aqueous solution, the coils may be rinsed with water.

After the ultrasonic cleaning, the copper coil may undergo a vibratory cleaning process at a block 104. As described in more detail below, the vibratory cleaning process may include placing the copper coil within a mixture of particulate medium through which vibrations are induced. In general, the vibrations cause the particulate medium to rub against the copper coils. It is this rubbing that removes any remaining insulation or other containments not removed by the ultrasonic cleaning process of block 102. Further, the rubbing may remove any metallic burrs that have developed on the copper coils, which beneficially smoothes the copper coil before insulation is reapplied. The copper coil may undergo the vibratory cleaning process for approximately 1 hour, at which point the copper coils may be substantially clean of insulation, other containments and metallic spurs. Then, at a block 106 the leads of each copper coil may be removed and new leads attached.

Because of the combination of ultrasonic and vibratory cleaning processes, a hand cleaning may not be necessary, as the copper coil may already be substantially free of insulation and other containments. Thus, after the new leads are attached, the coils may be sufficiently refurbished such that the process of preparing the coils for reuse may begin. Thus, at a block 108, the coils may be reinsulated. The reinsulation process includes applying new insulation to the copper coil. After reinsulation is complete, the copper coils are pressed at a block 110 and reassembled at a block 112. The reassembly at block 112 may include reattaching the poles that were separated from the coils at block 98. After an inspection at a block 114, the refurbished copper coil may be shipped back to the generator for reuse. Or, if the copper coil failed the inspection in some manner, the copper coil may be sent back to the beginning of the process or to any of the intermediate steps as necessary.

Figure 8:
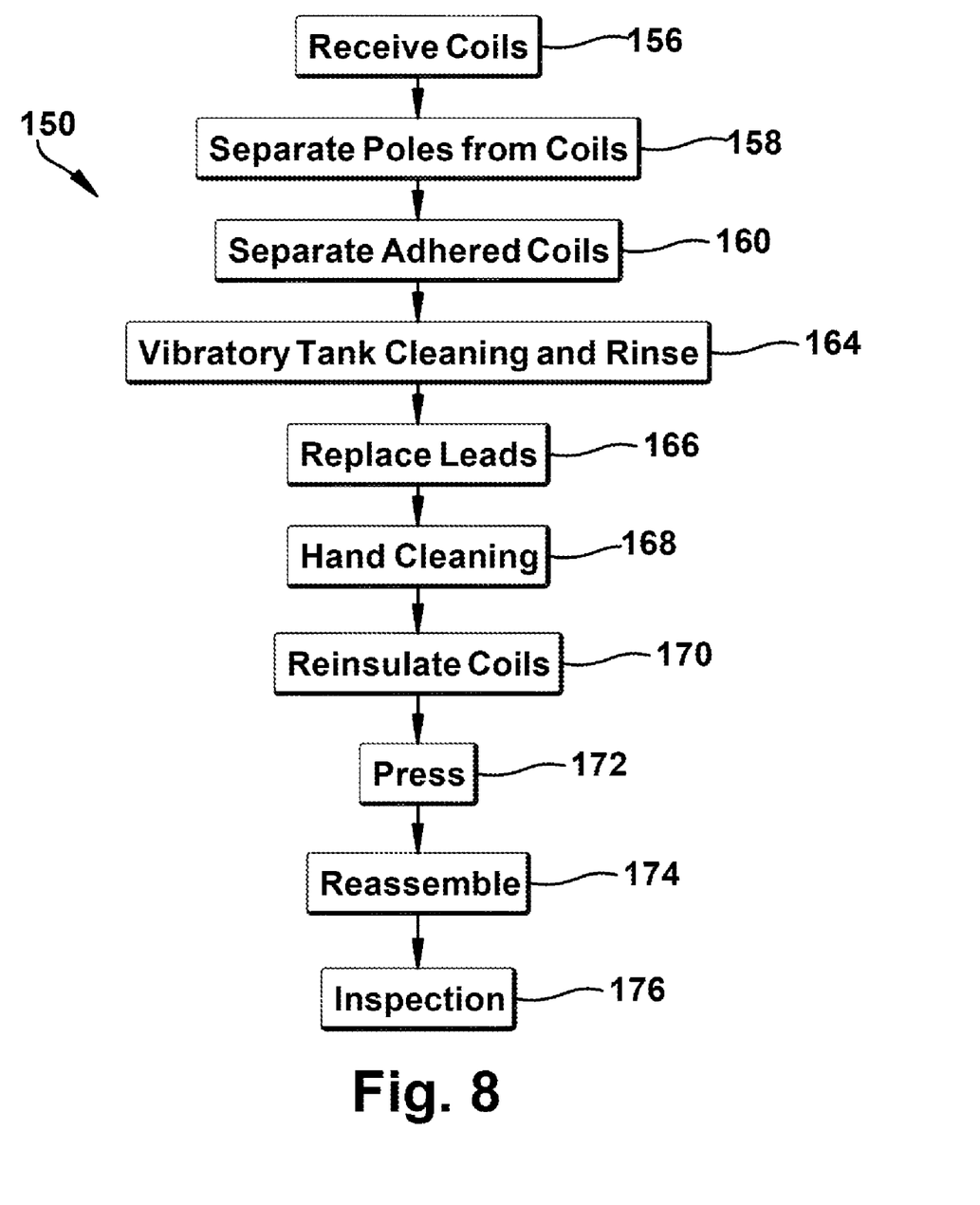
FIG. 8 is a schematic plan of a vibratory cleaning system in accordance with an exemplary embodiment of the present application.

FIG. 8 illustrates an exemplary vibratory cleaning system 120. The system may include a vibratory tank 122 and an actuator (not shown) that induces the vibratory tank 122 to vibrate. As pictured, a large copper coil 30 may be loaded on a rack 124 that supports the large copper coil 30 and also separates the individual turns 32. In some embodiments, as shown, the rack 124 may have round end plates 126 at each end. The round end plates 126 may allow the rack 124 and copper coil 30 loaded thereon to rotate within the vibratory tank 122 while the vibratory tank is being vibrated, which may aid in the cleaning process.

Figure 9:
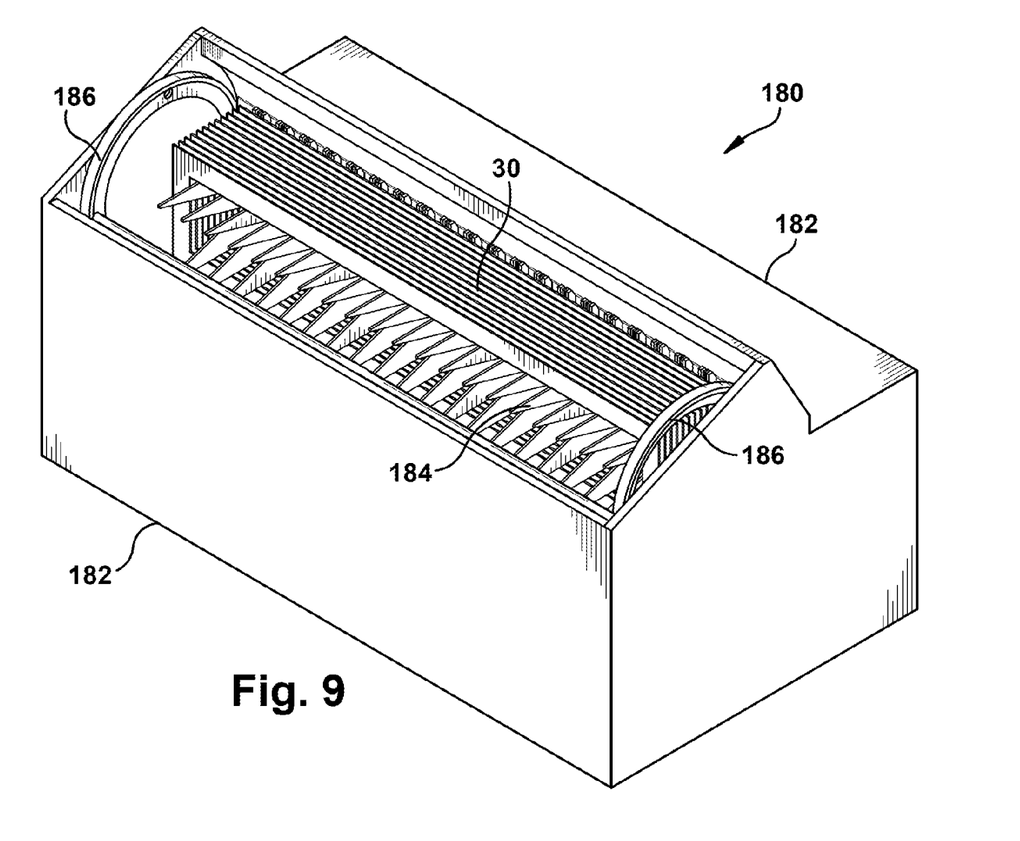
FIG. 9 is a perspective view of a particulate medium used within the vibratory cleaning system according to an exemplary embodiment of the present application.

As stated, the vibratory tank 122 may be filled with a mixture of water and a particulate medium (not shown). In some embodiments, the particulate medium may include a multitude of square shaped particles 123. As illustrated in FIG. 9, each side of the square shaped particles may measure approximately 20 mm. As one of ordinary skill in the art will appreciate, particles of other shapes, such as triangular, may be used. In some embodiments, the particulate medium may be ceramic. Those of ordinary skill in the art will appreciate that other types of vibratory cleaning systems may be used.

In use, the copper coil 30 may be submerged in the mixture of water and particulate medium within vibratory tank 122. The actuator may be activated such that the vibratory tank 122 is vibrated. The vibration may cause the particulate medium to rub against the copper coil 30, which will remove any insulation, other contaminants and/or metal spurs that remain on the copper coil. The actuator may cause the copper coil and rack 126 to rotate within the vibratory tank 122, which may further increase the amount of rubbing that takes place between the copper coil and the particulate medium. The actuator may be deactivated after approximately 1 hour and the copper coil removed from the vibratory tank 122. The time that the copper coil 30 is in the vibratory tank 122 may be increased or decreased depending on the level of cleaning desired.

Figure 10:
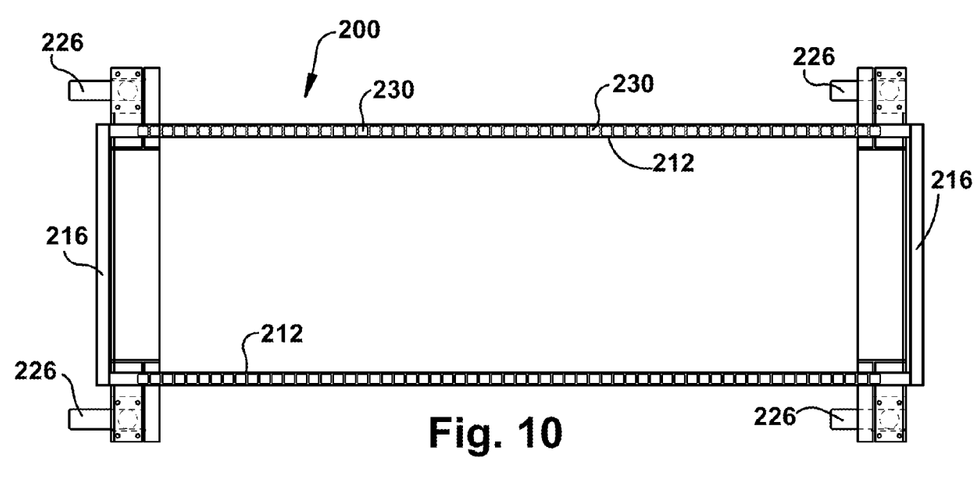
FIG. 10 is an overhead view of a transport cart according to an exemplary embodiment of the current invention.
Figure 11:
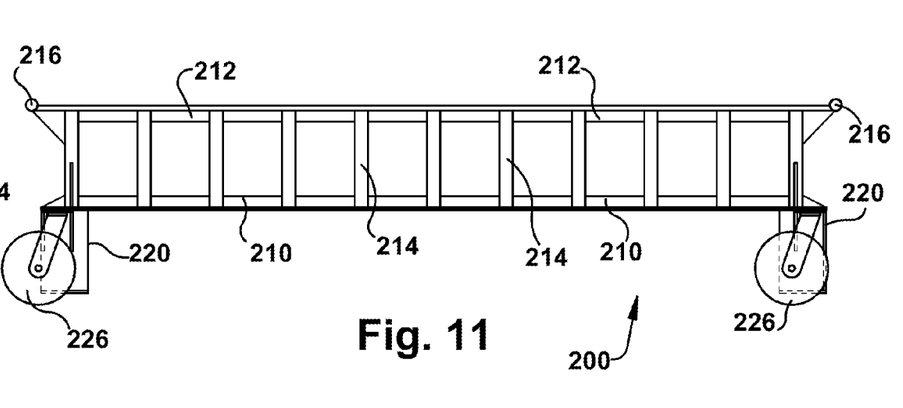
FIG. 11 is a side view of the transport cart of FIG. 10.
Figure 12:
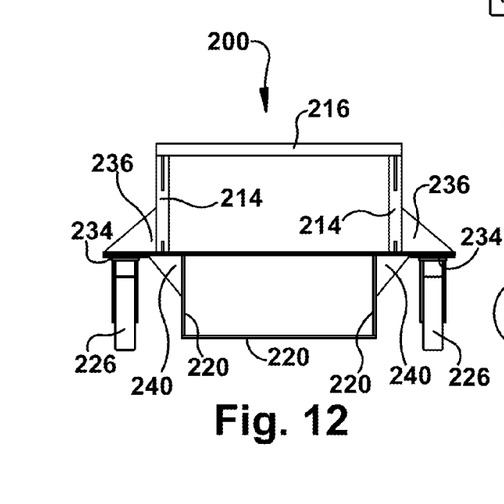
FIG. 12 is a front view of the transport cart of FIG. 10.

One of ordinary skill in the art will appreciate that transporting the various copper coils, i.e., the small copper coil 10, the medium copper coil 20, the large copper coil 30 and other coils, between cleaning stations in an efficient and cost-effective manner is a challenging task. The different types of copper coils have varying sizes, profiles, and number of turns such that it generally is difficult to transport them with the same transporting equipment. FIGS. 10, 11, and 12 illustrate various views of a transport cart 200 according to an exemplary embodiment of the current invention. As illustrated, the transport cart 200 may include the following features, though not all of the features may be included in all of the embodiments of the current application (as described in more detail below): side rails, which may include a lower side rail 210 and an upper side rail 212, vertical supports 214 that structurally connect the lower side rail 210 to the upper side rail 212, end rails 216, indirect connections 220, and wheels 226.

As illustrated, the upper side rails 212 and the end rails 216, may form an approximate rectangle. The upper side rails 212 may be approximately parallel to each other and parallel to the ground. The end rails and 216 may connect the end of one of the upper side rails 212 to the end of the other side rail 212. Generally, as illustrated, the upper side rails 212 will be longer than the end rails 216. For example, in some embodiments, the upper side rails 212 may be approximately 10 to 13 feet long, and the end rails 260 may be approximately 3 to 6 feet long. The lower side rails 210 may be approximately the same length as, beneath, and parallel to the upper side rails 212, such that the lower side rails 210 and the upper side rails 212 are contained in an approximate vertical plane. The vertical supports 214 may extend in a vertical direction between the lower side rails 210 and the upper side rails 212. In some embodiments, there may be approximately 8 to 12 vertical supports 214.

The upper side rails 212 may be formed such that there are multiple engagement recesses or pockets 230 disposed along its length, the function of which will be discussed in greater detail below. In some embodiments, and as illustrated, there may be approximately 40 to 60 pockets 230 formed along each the upper side rails 212. The pockets 230 may be oriented such that the opening to each of the pocket 230 faces substantially upward, i.e., the pocket 230 may be entered or accessible from above.

The transport cart 200 may be configured such that the upper side rails 212 are at a height of approximately 24 to 48 inches with respect to the ground. The lower side rails 210 may have a height from the ground of approximately half of the height of the upper side rails, i.e., approximately 12 to 24 inches. Those of ordinary skill in the art will appreciate that other heights are possible depending on the application.

As will be understood in the discussion concerning the use of the transport cart 200, it may be beneficial that the ends of the lower side rails 210 not be directly connected by a horizontal structural member, i.e., not be directly connected by a structural member that extends between the two ends of the lower side rails 210 at the same approximate height of the lower side rails 210. Instead, as illustrated, each end of the lower side rails 210 may be connected to the opposing end of the other side rail 210 by one of the indirect connections 220. As illustrated, the indirect connection 220 structurally connects the ends of the lower side rails 210 with rigid structural members that allow for more uninterrupted open space underneath the rectangle or area defined by the upper side rails 212 and the end rails 216, which will allow the transport cart 200 to haul additional copper coils. The indirect connection 220 achieves this result by employing a structural connection between the ends of the lower side rails 210 that initially extends in an approximate downward vertical direction from each end of the lower side rail 210. These two vertical members are then connected with a horizontal member that extends approximately parallel to the ground and resides in close proximity to the ground, as illustrated in FIGS. 10 through 12. The horizontal member of the indirect connection 220 may reside at a height of approximately 6-12 inches.

The transport cart 200 may also have four wheels 226. Each of the wheels 226 may be connected to a wheel plate 234. The wheel plate 234 may extend in an outward direction from the intersection of the outermost vertical support 214 and the end of the lower side rail 210. The wheel plate 234 may be supported by a triangular support 236. One edge of the triangular support 236 may be attached along the vertical support 214 and the other edge of the triangular support may be attached to the wheel plate 234. A second triangular support 240 may also be used to support the vertical members of the indirect connection 220, as illustrated. The wheels 226 may be a conventional wheel and may connect to the underside of the wheel plate 234 with a conventional mechanical attachment. In some embodiments, the wheels 226 may be attached such that they swivel. All mechanical connections described above in relation to the transport cart may be made pursuant to conventional means and apparatus, which may include, for example, mechanical fasteners or wielding.

Figures 13, 15:
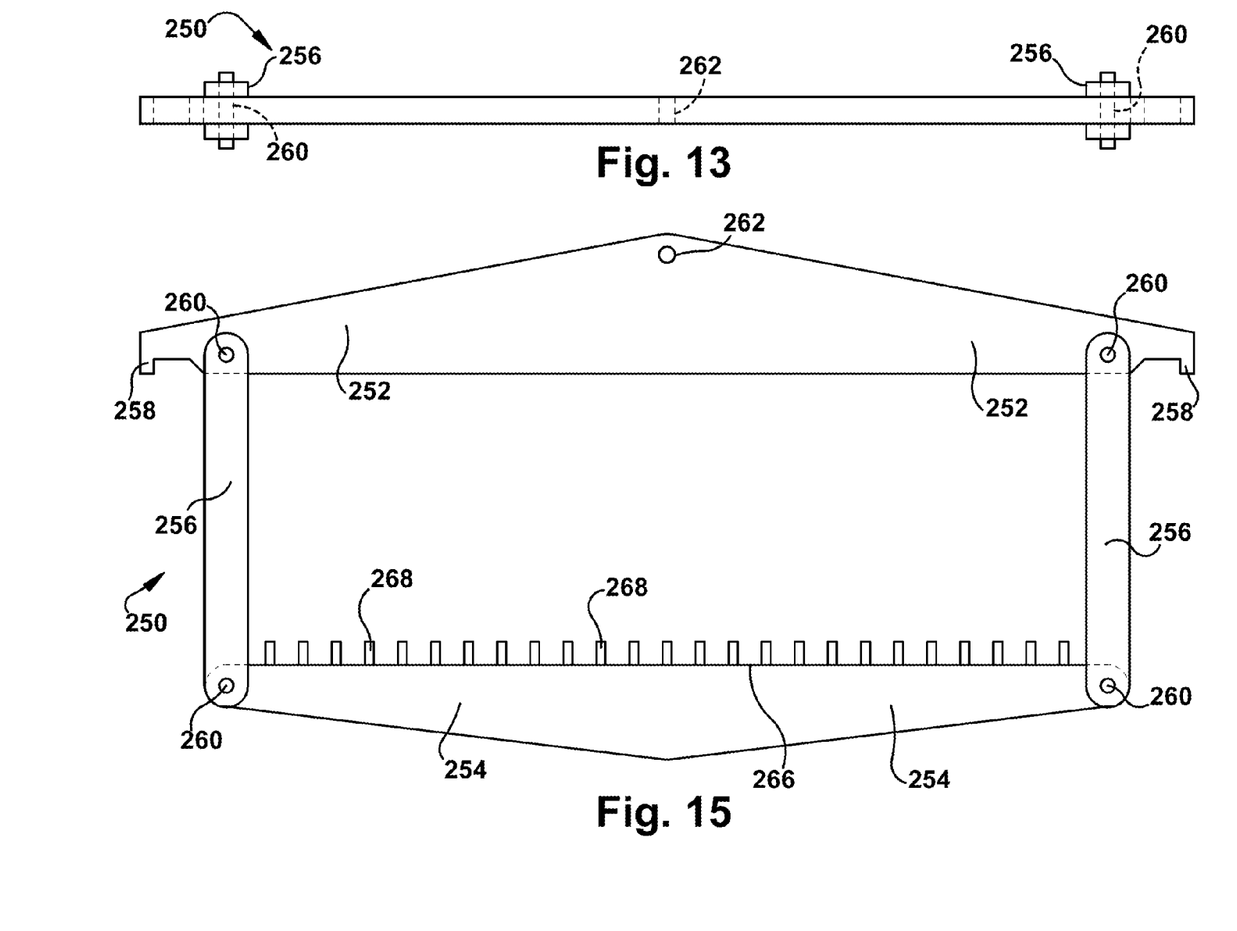
FIG. 13 is an overhead view of a hanger according to an exemplary embodiment of the current invention that may be used in conjunction with the transport cart of FIG. 10.
FIG. 15 is a front view of the hanger of FIG. 13.
Figure 14:
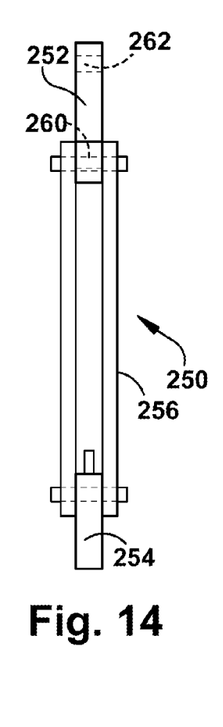
FIG. 14 is a side view of the hanger of FIG. 13.

A hanger 250, as illustrated in FIGS. 13-15, may be used in conjunction with the transport cart 200 to efficiently transport copper coils. The hanger 250 may include an upper support 252, a lower support 254, and vertical members 256 that connect the upper support 252 to the lower support 254. As viewed from the perspective of FIG. 15, the upper support 252 may be relatively long horizontally and short vertically. In some embodiments and as illustrated, the upper support 252 may be triangular in shape, though other shapes are possible, such as rectangular. As viewed from the perspective of FIG. 15, near each of the horizontal ends of the upper support 252, an aperture 260 through the upper support 252 may be located that is used to connect the upper support 252 to the vertical members 256. The vertical members 256 may be connected to the upper support 252 by bolts or pins or other such mechanical fasteners, and may be connected such that the vertical members 256 are able to swivel about the aperture 260. Also, at each of the horizontal ends of the upper support 252, a locking mechanism 258 may be formed. The locking mechanism 258, as discussed in more detail below, may be a short downward projection that is sized such that it may engage the pockets 230. In this manner, the position of the hanger 250 may be fixed across the transport cart 200, i.e., from a location on one upper side rail 212 to a position on the other upper side rail 212 substantially across from it. The support 252 may also include a center aperture 262, that may be used in conjunction with a connecting rod (not shown) to connect the upper support 252 to another upper support of an adjacent hanger 250 such that two or more hangers 250 may be used together.

The vertical members 256 may extend from the upper support 252 in a substantially downward direction to the lower support 254. Similar to the upper support 252 and as viewed from the perspective of FIG. 15, the lower support 254 may be long horizontally and short vertical. In some embodiments, the lower support 254 may be triangular in shape, though other shapes are also possible, such as rectangular. At each of the horizontal ends of the lower support 254, as viewed from the perspective of FIG. 15, an aperture 260 through the lower support 254 may be located that may be used to connect the lower support 254 to the vertical members 256. The vertical members 256 may be connected to the lower support 254 by bolts or pins or other such mechanical fasteners, and may be connected such that the vertical members 256 are able to swivel about the aperture 260. With each end of the vertical members 256 attached to the upper support 252 and the lower support 252 this manner, the lower support 254 may swivel back-and-forth in relation to the upper support 252, which, as one of ordinary skill in the art will appreciate, may help stabilize the hanger 250 when it is used to transport copper coils.

The top surface 266 of the lower support 254 may be flat and the lower support 252 may be supported by the vertical members 256 such that the flat top surface 266 is substantially horizontal. Along the top surface 266, a plurality of spacer pins 268 may be positioned. The spacer pins 268 may be short pins that extend from the top surface 266 of the lower support 254 in an approximate vertical direction, the use for which will be described in more detail below.

The hanger 250 may be sized such that it may be used in conjunction with the transport cart 200. Thus, the distance between the two locking mechanisms 258 of the hanger 250 may correspond to the distance between opposing pockets 230, i.e., pockets 230 on different upper side rails 212 that oppose each other across the cart 200. In some embodiments, therefore, the distance between the locking mechanisms 258 may be between approximately 3 and 6 feet. Generally, the length of the vertical members 256 will also depend on the application and the size of the transport cart 200. In some embodiments, though, the length of the vertical members 256 will be between approximately 12.00 to 156.00 inches. The spacer pins 268, in some embodiments, will be cylindrical in shape, with a diameter of approximately 0.25 to 1.00 inches and a length of approximately 2.00 inches. Other shapes, such as rectangular are also possible. The spacer pins 268 will be generally spaced evenly across the top surface 266 of the lower support 254. The distance between each of the spacer pins 268 will generally be approximately 0.50 to 2.00 inches.

In operation, the transport cart 200 may be used to transport various copper coils during cleaning and refurbishing procedures or other processes, which may include those refurbishing procedures described above. For example, the transport cart 200 may be used to transport the copper coils between ultrasonic cleaning and vibratory tank cleaning procedures or any of the other steps described above. And, because of its configuration, the same transport cart 200 may be used to efficiently transport different sized copper coils without time-consuming modification.

Figure 16:
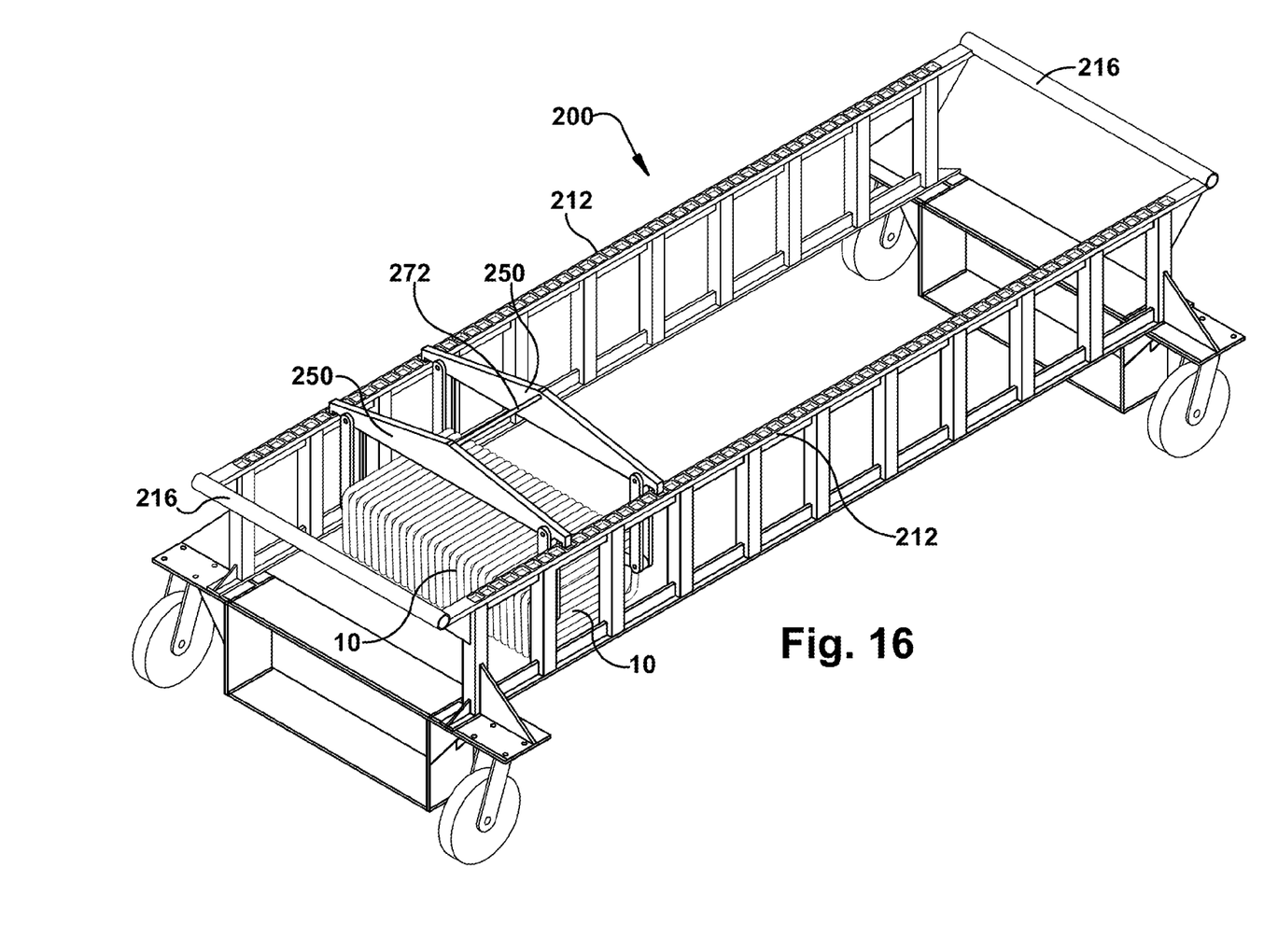
FIG. 16 is a perspective view of a transport cart and hanger according to an exemplary embodiment of the current invention as it might be loaded with a small sized copper coil.

For example, FIG. 16 illustrates a transport cart 200 and hangers 250 according to an exemplary embodiment of the current invention, as they might be used to transport the small copper coil 10. Two hangers 250 may be used to carry or support the small copper coil 10. As illustrated, the copper coil 10 may be supported by the lower supports 254 of the two hangers 250. Each of the locking mechanisms 258 of the two hangers 250 may be engaged within one of the pockets 230 along the upper side rail 212. The small copper coil 10, which may have an overall length of 10 feet, may be compressed such that several of its turns 22 fit between each of the spacer pins 268 and its overall length fits within the width of the transport cart 200. Also, as shown, a connecting rod 272 may connect the two hangers 252 such that the a lifting device (not shown) may engage the connecting rod 272 and lift the two hangers 250 and the copper coil 10. The connecting rod 272 may engage each of the hangers 252 in the aperture 262. In this manner, the copper coil 10 may be transported between cleaning or other stations and efficiently lifted so that it might be placed within an ultrasonic or vibratory cleaning tank. As will be appreciated, several small copper coils 10 may be transported by the transport cart 200 at the same time.

Figure 17:
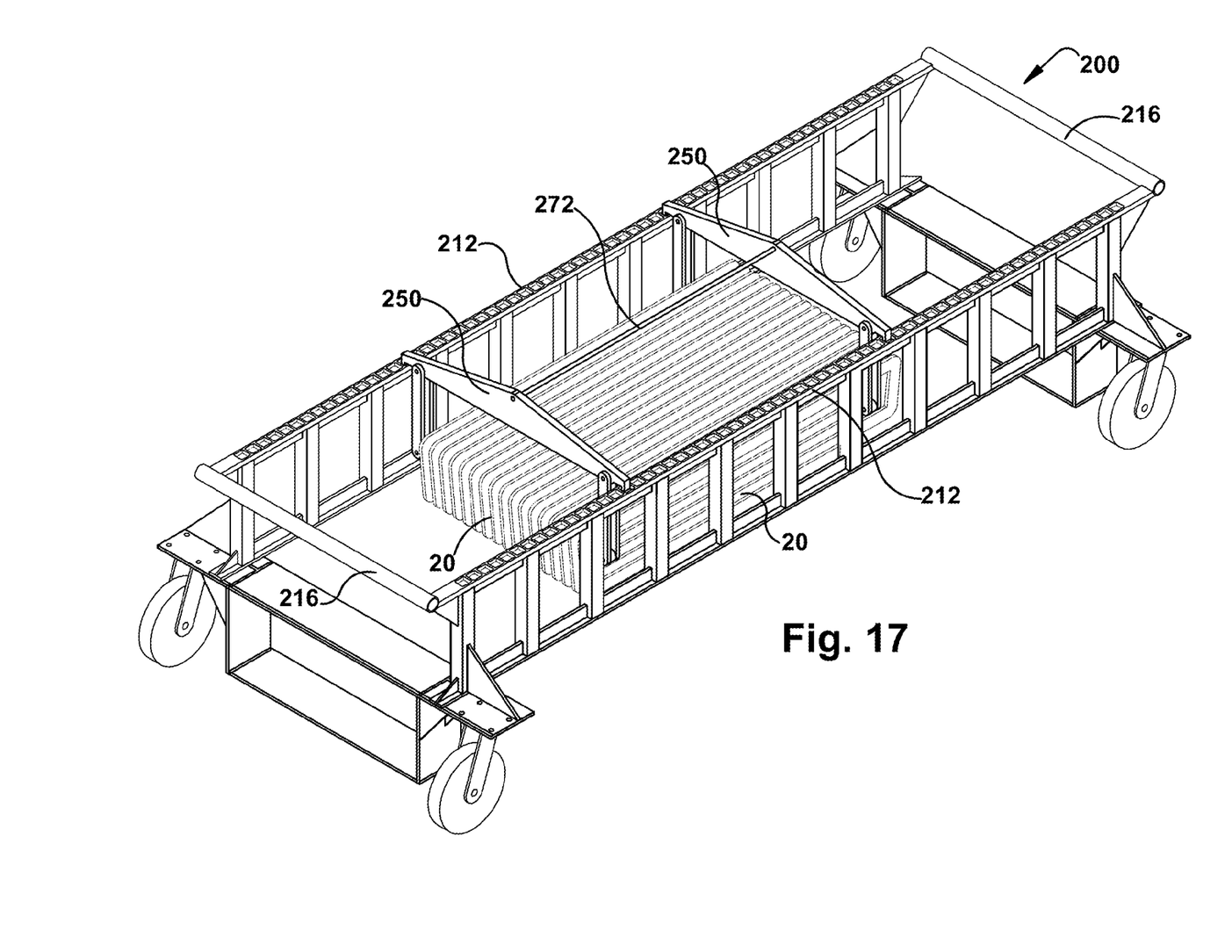
FIG. 17 is a perspective view of a transport cart and hanger according to an exemplary embodiment of the current invention as it might be loaded with a medium sized copper coil.
Figure 18:
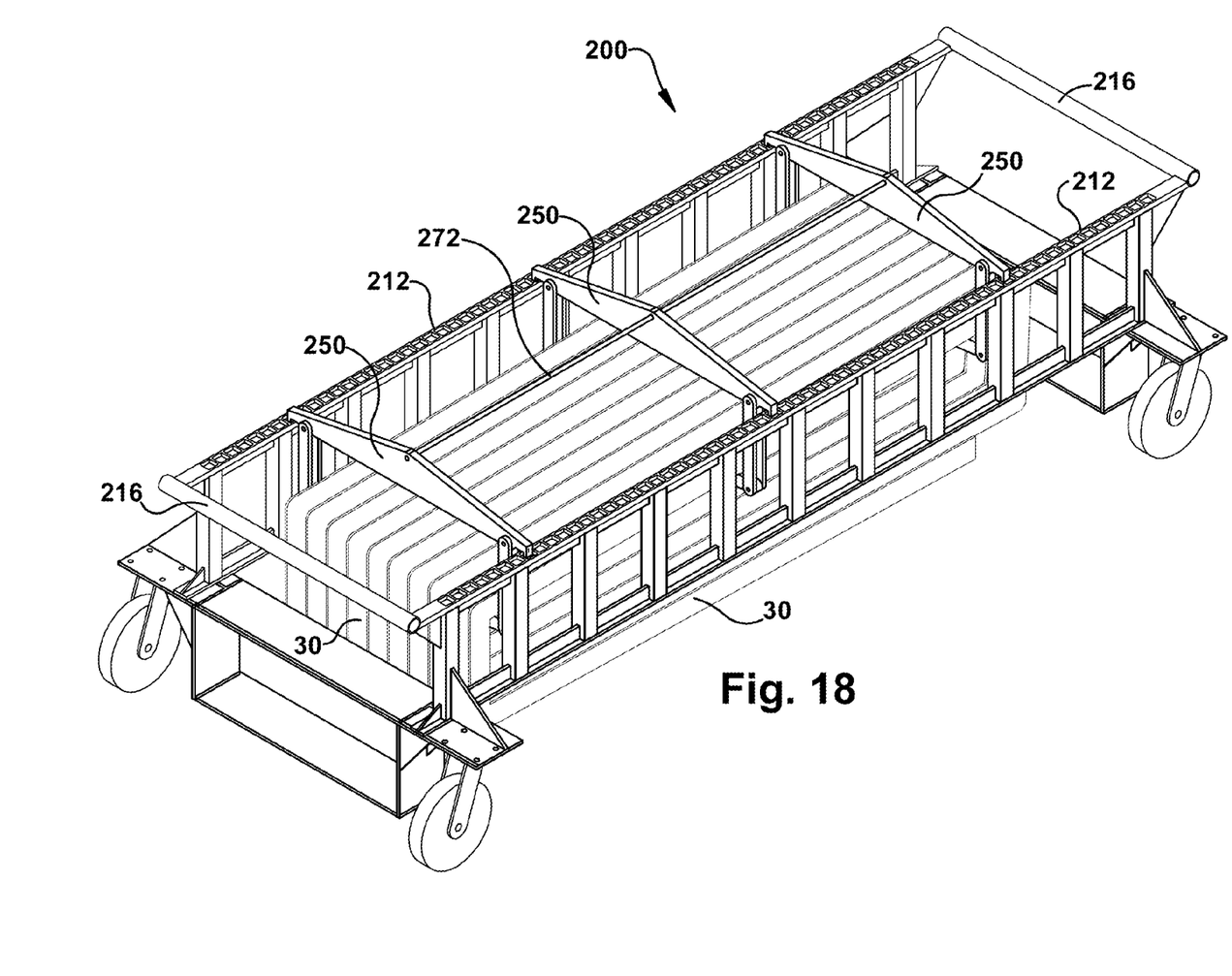
FIG. 18 is a perspective view of a transport cart and hanger according to an exemplary embodiment of the current invention as it might be loaded with a large sized copper coil.

The plurality of pockets 230 along the upper side rail 212 allow for the distance between the hangers 250 (when loaded on the cart 250) to be varied depending on the size of the copper coil. This feature provides for differing types of copper coils to be accommodated by the transport cart 200. For example, with larger copper coils, such as a medium copper coil 20 or a large copper coil 30, additional or more spread out hangers 250 may be used. As illustrated in FIG. 17, a larger copper coil, in this case a medium copper coil 20, is carried by two hangers 250 that are spaced farther apart than the hangers 250 that are depicted in FIG. 16. The larger copper coils generally have less turns 22 such that each turns 22 maybe separated from each of the adjacent turns 22 by the spacer pins 268. The separating of turns may aid in cleaning between the turns 22 during the refurbishment process. Further, the spacer pins 268 may prevent the coils from bunching on one side of the lower support 254 during transportation. The quick weight shift that may come with such bunching may pose a work hazard, which may be avoided with the use of the spacer pins 268. As illustrated in FIG. 18, a larger copper coil, for example a large copper coil 30, may be carried by three hangers 250 that are spaced out over the length of the cart 200. On of ordinary skill in the art will appreciate that other configurations and number of hanger 250 and the cart 200 may be used to transport other types and sizes of copper coils.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A cart and detachable hangers assembly, the assembly comprising:
   a cart with a substantially rectangular structure that includes at least two opposing side rails and at least two opposing end rails;
   a plurality of pockets disposed along each of the two opposing side rails; and
   at least two hangers, each of the hangers including two projections that are sized such that each may engage one of the pockets;
   wherein:
      each of the hangers further include an upper support, a lower support, and two vertical members that connect the upper support to the lower support;
      a plurality of spacer pins are disposed along a top surface of the lower support; and
      when each of the hangers is loaded onto the cart such that the projections are engaged with opposing pockets, the spacer pins comprise pins that extend from the top surface of the lower support in an approximate vertical direction.

2. The assembly according to claim 1, wherein the plurality of pockets includes approximately 40 to 60 pockets provided along each of the opposing side rails.

3. The assembly according to claim 1, wherein each of the hangers is configured such that one projection may engage one of the pockets on one of the side rails and the other projection may engage the opposing pockets on the other side rail.

4. The assembly according to claim 1, wherein:
   on each side of the rectangular structure, the side rails include a lower side rail and an upper side rail that are substantially parallel and contained in a substantially vertical plane;
   the lower side rail and the upper side rail on each side of the rectangle are connected by a plurality of vertical supports that extend in a substantially vertical direction; and
   the opposing ends of the lower side rails are connected by indirect connections.

5. The assembly according to claim 4, wherein:
   the upper side rails and the end rails are substantially parallel to the ground and reside at approximately the same height; and the corresponding ends of the upper side rails are connected by the end rails.

6. The assembly according to claim 4, wherein the upper side rails are longer than the end rails.

7. The assembly according to claim 4, wherein each of the upper side rails is approximately 10 to 13 feet long and each of the end rails is approximately 3 to 6 feet long.

8. The assembly according to claim 4, wherein the pockets are disposed on the top surface of the upper side rail and the pockets are oriented such that the opening to each of the pockets faces substantially upward.

9. The assembly according to claim 4, wherein the upper side rails reside at a height of approximately 24 to 48 inches and the lower side rails reside at a height of approximately half of the height of the upper side rails.

10. The assembly according to claim 4, wherein the indirect connections comprise two approximately vertical members that extend in a downward direction from each of the opposing ends of the lower side rails and a substantially horizontal member that connects lower ends of the two vertical members.

11. The assembly according to claim 1, wherein the spacer pins are spaced across the top surface of the lower support such that there is approximately 0.5 to 2.0 inches between adjacent spacer pins.

12. The assembly according to claim 1, wherein:
each of the hangers is configured such that when each is loaded onto the cart the projections engage opposing pockets;
the upper support is relatively long horizontally and short vertically; and
the lower support is relatively long horizontally and short vertically.

13. The assembly according to claim 12, further comprising a connecting rod;
wherein:
the upper support and the lower support are triangular in shape;
an aperture is located near each of the horizontal ends of the upper support and the lower support, the apertures being used to connect the upper support to the lower support via the two vertical members; and
a center aperture is located in the approximate center of the upper support, the center aperture being configured so that the center aperture may be used in conjunction with the connecting rod to connect one hanger to the other hanger.

14. A cart and detachable hangers system for transporting copper coils, the cart and hanger system comprising:
a cart with a substantially rectangular structure that includes at least two opposing side rails and at least two opposing end rails;
a plurality of pockets disposed along a top surface of each of the two opposing side rails; and
a plurality of hangers, each of the hangers including two projections that are sized such that each may detachably engage one of the pockets;
wherein the hanger and the cart are sized such that the distance between the projections correspond approximately to the distance between the pocket on one upper side rail and the opposing pocket on the other upper side rail;
wherein each of the hangers further include an upper support, a lower support, and two vertical members that connect the upper support to the lower support;
wherein a plurality of spacer pins are disposed along a top surface of the lower support; and
when the hangers are loaded onto the cart such that the projections are engaged with opposing pockets, the spacer pins comprise pins that extend from the top surface of the lower support in an approximate vertical direction.

15. The cart and hanger system according to claim 14, wherein:
on each side of the rectangular structure, the side rails include a lower side rail and an upper side rail that are substantially parallel and contained in a substantially vertical plane;
the lower side rail and the upper side rail one each side of the rectangle are connected by a plurality of vertical supports that extend in a substantially vertical direction; and
the opposing ends of the lower side rails are connected by indirect connections.

16. The cart and hanger system according to claim 15, wherein:
the upper side-rails and the end rails are substantially parallel to the ground and reside at approximately the same height;
the corresponding ends of the upper side rails are connected by the end rails; and each of the upper side rails is approximately 10 to 13 feet long and each of the end rails is approximately 3 to 6 feet long.

* * * * *